Oct. 21, 1969  J. A. KELLY, JR ET AL  3,474,183
MID-SPAN SERVICE ATTACHMENT FOR SECONDARY DISTRIBUTION SYSTEM
Filed Aug. 23, 1967  2 Sheets-Sheet 1

INVENTORS.
James A. Kelly, Jr.
BY Daniel A. McLaughlin

Paul & Paul
ATTORNEYS.

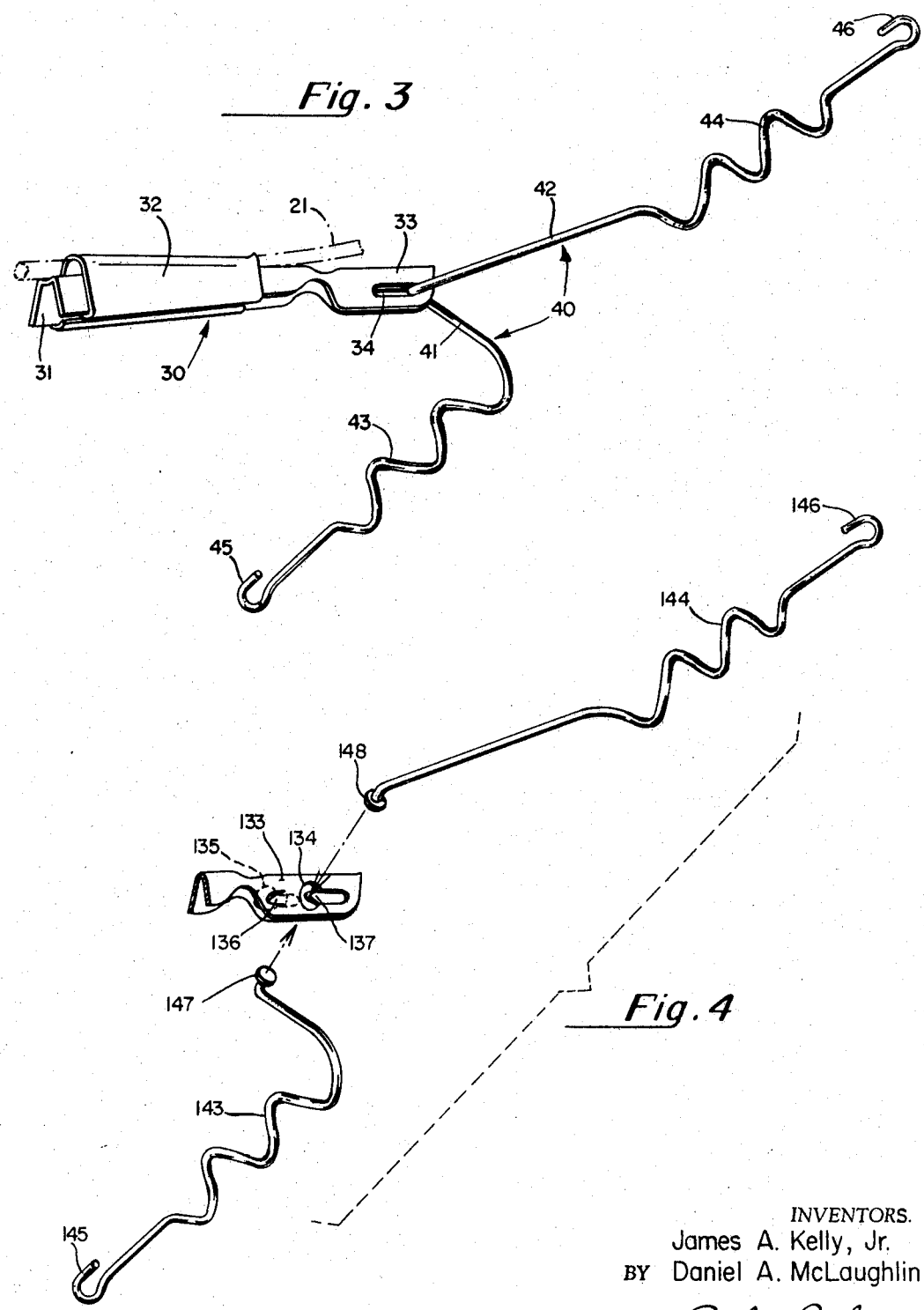

United States Patent Office 3,474,183
Patented Oct. 21, 1969

3,474,183
MID-SPAN SERVICE ATTACHMENT FOR SECONDARY DISTRIBUTION SYSTEM
James A. Kelly, Jr., 3712 Woodland Ave., Drexel Hill, Pa. 19026, and Daniel A. McLaughlin, Box 17, Valley Road, Gradyville, Pa. 19342
Filed Aug. 23, 1967, Ser. No. 662,682
Int. Cl. H02g 7/06, 7/20
U.S. Cl. 174—41                                    3 Claims

ABSTRACT OF THE DISCLOSURE

A mechanical strain attachment is disclosed for attaching service cables to pole-line-supported lashed-cable electric-power secondary distribution lines at points intermediate the poles. A wedge clamp grips the service neutral by a wedging action. The wedge clamp is secured to the distribution neutral by a preformed spring wire having preformed helical sections on either side of a central apex. The helices are manipulated about the distribution neutral to grip it. Hooks are provided at each end of the spring wire for connection to the severed ends of the lashing wires of the distribution line, thereby to prevent sliding of the helices along the distribution neutral. The electrical connections are made in the usual way.

BACKGROUND OF THE INVENTION

Field of the invention

This invention relates to a mid-span connection for a lashed-cable assembly in a pole-line-supported electric secondary distribution system.

Description of the prior art

The prior art patents which are deemed most pertinent to the present invention are the following: Winn, 2,677,-717; Flower, 2,825,751; Fulps, 2,887,524; Husted, 3,019,-282; and Nordstrom, 3,133,985.

SUMMARY OF THE INVENTION

Lashed-cable assemblies are being used to an increasing extent in pole-line-supported electric-power secondary distribution systems. Such lashed-cable assemblies, in a typical case, comprise three cables bound together with a lashing wire. Two of the cables are energized and ungrounded; the third is the grounded neutral which also functions as the supporting messenger. To allow greater spacing between poles, it is desirable, of course, that service connections be made to such lashed-cable assemblies at mid-span or between-pole locations.

The present application describes an improved mechanical-strain service attachment which can be readily installed to secure the neutral cable of the service connection to the grounded neutral cable of the distribution system.

The mechanical-strain service attachment assembly comprises a wedge clamp to which the service neutral is secured by wedging action. A preformed spring wire secures the wedge clamp to the grounded neutral cable of the distribution assembly. The mid-portion of the spring wire is secured to the wedge clamp. Divergent straight-leg portions extend angularly from the mid-portion, and preformed helices extend outwardly from the ends of the divergent straight-leg portions. To install the device, the preformed helices are manipulated around the embrace the distribution line neutral wire. Beyond the helices, a hook is provided at each terminal end of the spring wire. The ends of the severed lashing wire of the distribution line cable assembly are secured to these hooks to prevent slipping of the device along the distribution neutral.

BRIEF DESCRIPTION OF THE DRAWING

FIG. 3 is a perspective view of a preformed form of mechanical-strain attachment according to the present invention;

FIG. 4 is a perspective view of a modified form of mechanical-strain attachment.

DESCRIPTION OF THE PREFERRED EMBODIMENTS

Figure 1:
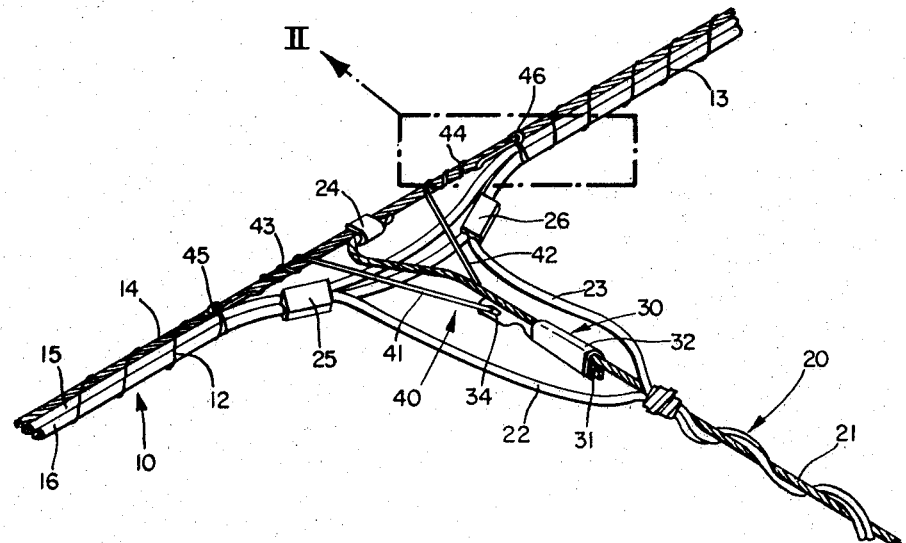
FIG. 1 is a perspective view of a mid-span service take-off showing how the mechanical-strain attachment of the present invention is employed in a typical case.

Reference is first made to FIGURE 3 which shows in perspective a preferred form of mid-span mechanical-strain service attachment. The attachment comprises a wedge clamp 30 and a spring wire 40. The wedge clamp 30 comprises an elongated tapered inner member 31 and a shorter tapered outer member 32. Inner member 31 has a head portion 33 which projects beyond the tapered portions of the members 31 and 32. Both of these members are inverted U-shaped in cross-section. Except for the particular shape of the hole 34 in the head 33, the wedge clamp 30 is a well known type and need not be described further. The service neutral 21 is passed between the upper surface of the inner member 31 and the under surface of the outer member 32. The pull on the service neutral 21 is toward the left, as viewed in FIG. 3, and thus, the service neutral becomes tightly wedged between the inner and outer members of the wedge clamp 30.

The head portion 33 of member 31 extends toward the distribution line. As indicated above, head 33 is U-shaped in cross section. Each leg is provided with a slot which is in registry with the slot in the other leg forming a through opening or through slot 34 which, in accordance with the preferred embodiment of the present invention, is of sufficient size to facilitate passing therethrough the spring member 40.

In the preferred embodiment, illustrated in FIG. 3, spring member 40 is an integral piece which extends from the hook 45 through the preformed helix 43, the divergent straight legs 41, 42, the preformed helix 44, to the hook 46 at the other end.

The divergent straight legs 41, 42 form a V-shaped portion the apex of which is positioned at the elongated slot 34 in the head 33 of the wedge clamp member 31. The straight leg portions 41 and 42 extend divergently outwardly thereform. The preformed helical portions 43 and 44 are located between the straight leg portions 41 and 42 and the hook ends 45 and 46. Each helix may have of the order of three turns.

Reference is now made to FIG. 1 which illustrates how the mechanical-strain attachment is used as a mid-span service attachment for a lashed-wire secondary distribution system.

The lashed-wire secondary distribution system is illustrated in FIG. 1 as comprising three multi-strand cables, two of which, 15 and 16, are provided with an insulated covering. The strands may be copper but are preferably aluminum. Cables 15 and 16 are energized, for example, 240 volts between the cables. The third cable 14 is a grounded or neutral cable having no insulating covering. This cable also serves as the supporting messenger. It is also ordinarily a multi-strand cable. The center strand may be steel; the other strands may be copper but preferably aluminum.

The three-cable assembly is held together by a lashing wire which (assuming there are no mid-span service connections) extends continuously throughout the length of the cable assembly. When the service connection is to be made, the lashing wire is severed at the point of the service connection, forming the separated lashing wires 12 and 13 in FIG. 1. The three cables 14, 15 aand 16 are then spread apart and the service connection made. In FIG. 1, the service neutral 21 is connected electrically to the secondary neutral 14 at the compression connector 24. The service cable 22 is connected electrically to the distribution cable 15 at the compression connector 25, and the service cable 23 is connected to the distribution cable 16 at the compression connector 26. It will be understood that in the case of the cables 15, 16 and 22, 23, which have insulating coverings, the insulation is removed at the connection points.

Figure 2:
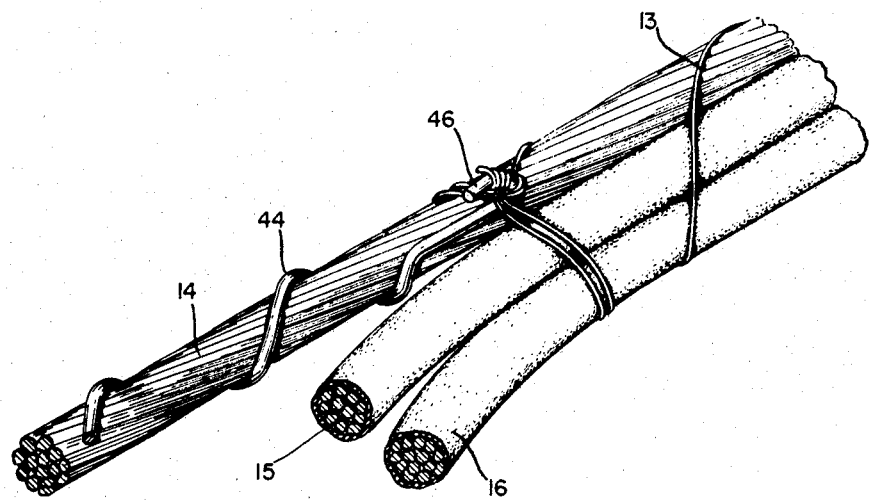
FIG. 2 is an enlarged detail view of the area shown in dot-and-dash line in FIG. 1 to show how the lashing wire is secured to the hook end of the spring wire.

It will be seen that the strain imposed by the weight of the service cable assembly 20 is taken by the wedge clamp 30 which is connected mechanically to the neutral 14 of the distribution assembly by the preformed helices of spring wire 40. To assemble the mechanical-strain device, one hook end of the spring wire 40 is inserted through the slot 34 in the head 33 of the member 31 of the wedge clamp 30, and the wire 40 is pulled half-way through, so that the apex of the V-portion 41, 42 is at the slot 34. The preformed helical portion 43 is then manipulated about the neutral 14 at the one side of the compression connection 24, and the other preformed helical portion 44 is manipulated about the neutral cable 14 at the other side of the compression connector 24. The lashing wires 12 and 13 are then secured to the hooks 45 and 46, respectively. A preferred way of connecting the lashing wires to the hooks is illustrated in FIG. 2, wherein the terminal portion of lashing wire 13 is wrapped once around the hook 46, then several more times around the three cables 14, 15 and 16, and finally the extreme terminal portion of the lashing wire 13 is wrapped several times around the hook 46. The other lashing wire 12 is secured in similar manner at hook 45. The lashing wire is dead soft. It has little or no resiliency.

The mechanical-strain attachment illustrated in FIGS. 1–3 represents a presently preferred form. A modified form is illustrated in FIG. 4. The modified form differs from that of FIG. 3 in that the spring wire is in two separate sections, rather than being integral as in FIG. 3. In FIG. 4, the one member comprises the terminal hook 145, the helical portion 143 and the terminal button 147. The other spring member is similar and comprises the terminal hook 146, the helical portion 144 and the terminal button 148. Only the head portion 133 of the inner member of the wedge is shown in FIG. 4. In lieu of a through slot, each leg of the U-shaped head 133 includes a keyhole slot 134 and 135, these slots being staggered in location so that the one inward strike 136 is opposite the enlarged or hole portion of keyhole slot 135, and the other strike 137 is opposite the enlarged or hole portion of keyhole slot 134. It will be understood that the strikes 136 and 137 are struck after the buttons 146 and 147 have been inserted into the head holes of keyholes 134 and 135 and slid back through the narrow legs. In this manner the spring wire members are held captive in the head 133 of the wedge clamp.

Prior to the development of the mechanical strain attachment illustrated in the drawing of the present application and described above, it was conventional to use hardware consisting of four parts, as follows:

A wedge clamp, with bail, secured to the service neutral;

A take-off clamp bolted to the secondary neutral, having a loop which receives the wedge-clamp bail;

Two small clamps bolted to the secondary neutral used for securing the respective loose ends of the lashing wire. An example of such clamps may be seen in the Fulps Patent 2,887,524.

It will be seen that in comparison with prior art hardware, the attachment of the present invention has fewer parts and is more readily and quickly installed. The three clamps which, according to the prior art, were bolted to the secondary neutral, are eliminated. The preformed helical spring wire 40 is readily manipulated into gripping engagement with the secondary neutral 14. The hooks 45 and 46 at the ends of the spring wire 40 serve as terminatives for the severed ends of the lashing wire 12, 13. The connection of the lashing wire to the hook ends of the spring wire 40 tends to improve dimensional stability, since any tendency for the spring wire helices to slide along the secondary neutral is resisted. In brief, a firm mechanical-strain attachment of adequate strength and neat appearance is provided which is adapted to be quickly and readily installed. The connections of the energized conductors of the service cable 20 to the corresponding conductors of the lashed secondary cable assembly 10 are conventional.

What is claimed is:

1. In combination with an electric-power secondary distribution system having:
   (1) a lashed-wire cable assembly in which the distribution neutral also serves as the supporting messenger, and
   (2) a service cable attached to said distribution neutral,
   (3) the lashing wire of said cable assembly being severed at the attachment location,
   (4) a portion of the lashing wire adjacent each respective end being wound around said assembly on either side of said attachment location,
a strain attachment for securing said service cable to said distribution neutral comprising:
   (a) a preformed spring wire having straight leg portions diverging from a central apex portion, a preformed helix extending outwardly from the end of each divergent straight leg portion gripping by an embracing action the distribution neutral at spaced-apart locations, and a preformed hook at each terminal end of said preformed spring wire beyond the helix securing the ends of the severed lashing wire and preventing their unwinding from said cable assembly and slippage of the helices along the distribution neutral,
   (b) means engaged with the apex portion of said preformed spring wire and with said service cable for supporting said service cable from said preformed spring wire.

2. A secondary distribution system according to claim 1 characterized in that the preformed spring wire is an integral piece from the hook at one end to the hook at the other, and further characterized in that said means for supporting said service cable comprises a wedge clamp having a slot for receiving said spring wire and that said slot is of sufficient size for passing therethrough the hook and preformed helix portion of said spring wire.

3. A mid-span mechanical strain attachment for securing service cables to a lashed-wire cable assembly in electric-power secondary distribution systems, in which the distribution neutral also serves as the supporting messenger, and in which the lashing wire of said assembly is severed at the attaching location, said attachment comprising:
   (a) a preformed spring wire consisting of two pieces, each having a straight leg portion diverging from a central apex portion provided with an enlarged head, a preformed helix extending outwardly from the end of each divergent straight leg portion for gripping by an embracing action the distribution neutral at spaced-apart locations, and a preformed hook at each terminal end of said preformed spring wire beyond the helix for securing the ends of the severed lashing wire and thereby preventing slippage of the helices along the distribution neutral, (b) a wedge clamp having inner and outer members for receiving therebetween the service neutral for holding the same by wedging action, (c) said wedge clamp having a slot at one end for receiving the apex portion of said preformed spring wire and for supporting said wedge clamp from said distribution neutral, said slot having an enlarged portion for receiving the spring wire head and a smaller portion for retaining the head.

References Cited

UNITED STATES PATENTS

| 2,781,212 | 2/1957 | Jugle | 24—126 X |
| 3,019,282 | 1/1962 | Husted | 174—43 |
| 3,133,985 | 5/1964 | Nordstrom | 174—43 |

FOREIGN PATENTS 673,302  10/1963  Canada.

LARAMIE E. ASKIN, Primary Examiner

U.S. Cl. X.R.

24—126, 131; 174—43